US011418469B2

(12) United States Patent
Han et al.

(10) Patent No.: US 11,418,469 B2
(45) Date of Patent: Aug. 16, 2022

(54) METHOD, SYSTEM, AND NON-TRANSITORY COMPUTER-READABLE RECORD MEDIUM FOR PROVIDING FICTION IN MESSENGER

(71) Applicant: LINE Plus Corporation, Seongnam-si (KR)

(72) Inventors: Seung Wook Han, Seongnam-si (KR); Su Ahn Lee, Seongnam-si (KR); Youngsub Park, Seongnam-si (KR); Jaeyun Jung, Seongnam-si (KR); Hee Jong Lee, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 0 days.

(21) Appl. No.: 17/244,062

(22) Filed: Apr. 29, 2021

(65) Prior Publication Data

US 2021/0250312 A1 Aug. 12, 2021

Related U.S. Application Data

(63) Continuation of application No. PCT/KR2018/013239, filed on Nov. 2, 2018.

(51) Int. Cl.
*G06F 15/16* (2006.01)
*H04L 51/046* (2022.01)
(Continued)

(52) U.S. Cl.
CPC ........... *H04L 51/046* (2013.01); *G06Q 50/01* (2013.01); *H04N 21/4532* (2013.01); *H04N 21/472* (2013.01); *H04N 21/4788* (2013.01)

(58) Field of Classification Search
USPC ....................................................... 709/206
See application file for complete search history.

(56) References Cited

U.S. PATENT DOCUMENTS 8,566,348 B2 * 10/2013 Rinearson ............... G06F 16/93
707/706
8,782,135 B2 * 7/2014 Roman .................. G06Q 50/01
709/204
(Continued)

FOREIGN PATENT DOCUMENTS

JP 2003-006348 A 1/2003
KR 2002-0067284 A 8/2002
(Continued)

OTHER PUBLICATIONS

International Search Report dated Aug. 1, 2019 issued in International Patent Application No. PCT/KR2018/013239.

*Primary Examiner* — Anthony Mejia
(74) *Attorney, Agent, or Firm* — Harness, Dickey & Pierce, P.L.C.

(57) ABSTRACT

Methods, systems, and non-transitory computer-readable record mediums for providing a fiction through a messenger may be provided. A fiction providing method including receiving content and an output time interval associated with the content from a content provider terminal, storing the content and the output time interval, registering a fiction that comprises the content, and providing the content to a first user terminal to replay the content included in the fiction at the output time interval based on a first user setting associated with a first user account through a chatroom in which the first user account and a bot account related to the fiction participate on a messenger installed on the first user terminal may be provided.

21 Claims, 11 Drawing Sheets

(51) Int. Cl.
*G06Q 50/00* (2012.01)
*H04N 21/45* (2011.01)
*H04N 21/472* (2011.01)
*H04N 21/4788* (2011.01)

(56) References Cited

U.S. PATENT DOCUMENTS

| | | | | |
|---|---|---|---|---|
| 8,793,593 | B2* | 7/2014 | Rasmussen | G06Q 10/10 |
| | | | | 705/26.1 |
| 8,849,721 | B2* | 9/2014 | Fedorov | G06Q 10/101 |
| | | | | 709/205 |
| 9,032,290 | B2* | 5/2015 | Shepherd | G06F 40/284 |
| | | | | 715/255 |
| 9,092,211 | B2* | 7/2015 | Ng | G06F 16/9024 |
| 9,432,746 | B2* | 8/2016 | Spears | H04N 21/854 |
| 10,021,059 | B1* | 7/2018 | Rao | H04L 63/102 |
| 10,924,446 | B1* | 2/2021 | Paul | H04L 51/10 |
| 2008/0097826 | A1* | 4/2008 | Leach | G06Q 50/01 |
| | | | | 705/319 |
| 2008/0103878 | A1* | 5/2008 | Leach | G06Q 30/0241 |
| | | | | 705/319 |
| 2016/0246464 | A1* | 8/2016 | Havard | G06F 3/048 |

FOREIGN PATENT DOCUMENTS

| | | |
|---|---|---|
| KR | 2006-0094414 A | 8/2006 |
| KR | 10-0948428 B1 | 3/2010 |
| KR | 2014-0018650 A | 2/2014 |

\* cited by examiner

| Write a fiction | |
|---|---|
| Cony: Going to see Brown at 7 tomorrow! | 2sec |
| Commentary: Brown went to LINE Café where friends are gathered. | 1sec |
| James: Did you watch this video? | 3sec |
| Sally: Wow! It's really funny. | 0.5sec |
| Brown: I'll show it to Connie. | 0.5sec |

501 — Character/commentary ▽
502 — Line/contents ✚
503 — Time interval

[Register]  [Preview]

METHOD, SYSTEM, AND NON-TRANSITORY COMPUTER-READABLE RECORD MEDIUM FOR PROVIDING FICTION IN MESSENGER

CROSS-REFERENCE TO RELATED APPLICATION(S)

This U.S. non-provisional application is a continuation application of, and claims the benefit of priority under 35 U.S.C. § 365(c) to International Application No. PCT/KR2018/013239, filed Nov. 2, 2018, the entire contents of which are incorporated herein by reference in their entirety.

BACKGROUND

Technical Field

One or more example embodiments relate to technology for providing a fiction using a messenger.

Related Art

With the development of the Internet, books that have been published offline can be provided through the Internet.

A general fiction (e.g., a fiction published offline) provides an interface through which a user reads statically written articles in a sequential manner.

Meanwhile, unlike existing fictions, web fictions currently being serviced to many users are developed in a form of a play in which names and lines of characters are formed in a single line or a paragraph.

SUMMARY

Some example embodiments may provide a replay function of sequentially outputting lines of a fiction based on a message unit through a chat interface of a messenger.

Some example embodiments may provide an interface environment having liveness and immersion by differently setting an output time interval for each content according to the content development or situation of a fiction.

Some example embodiments may provide a function that allows a user to directly input a comment for each content of a fiction being replayed and a function of verifying preferences of other users.

Some example embodiments may provide an environment that allows a user participation by outputting lines of a character selected by a user as a user side message through a chat interface of a messenger.

According to an aspect of at least one example embodiment, a fiction providing method performed by a computer system, which includes at least one processor configured to execute computer-readable instructions included in a memory, includes by the at least one processor, receiving, by the computer system, content and an output time interval associated with the content from a content provider terminal, storing, by the computer system, the content and the output time interval, registering, by the computer system, a fiction that includes the content, and providing, by the computer system, the content to a first user terminal to replay the content included in the fiction at the output time interval based on a first user setting associated with a first user account through a chatroom in which the first user account and a bot account related to the fiction participate on a messenger installed on the first user terminal.

The registering may include receiving the content and the output time interval from the content provider terminal through a fiction writing tool that includes a function of inputting the content and the output time interval associated with the content.

The fiction providing method may further include creating, by the computer system, the chatroom in which the first user account and the bot account participate in response to a permission for the fiction being given to the first user account.

The fiction providing method may further include creating, by the computer system, a community channel corresponding to the fiction in response to a request from the content provider terminal, and adding, by the computer system, the first user account to the community channel in response to a permission for the fiction being given to the first user account. The providing may include creating the chatroom in which the first user account and the bot account participate in association with the community channel.

The registering may include associating a plurality of contents received from the content provider terminal with a subset of the fiction, and the providing may include creating a first chatroom in which the first user account and the bot account participate in association with the community channel in response to a permission for the subset being given to the first user account, and providing a plurality of contents included in the subset to the first user terminal to replay each of the plurality of contents at a corresponding output time interval through the first chatroom on the messenger in response to a request from the first user terminal for the subset.

The creating a community channel may include creating a community chatroom in association with the community channel, and the adding may include allowing the first user account to participate in the community chatroom in response to the permission for the fiction being given to the first user account.

The fiction providing method may further include calculating, by the computer system, statistical information for each content based on a comment or a preference on each content of the fiction received from a plurality of user terminals, and providing, by the computer system, the statistical information for each content to the content provider terminal or at least one user terminal among the plurality of user terminals.

According to an aspect of at least one example embodiment, there is provided a non-transitory computer-readable record medium storing instructions that, when executed by a processor, cause a computer system to perform the foregoing fiction providing method.

According to an aspect of at least one example embodiment, a computer system including at least one processor configured to execute computer-readable instructions included in a memory such that the at least one processor configures the computer system to receive content and an output time interval associated with the content from a content provider terminal, store the content and the output time interval, register a fiction that includes the content, and provide the content to a first user terminal to replay the content included in the fiction at the output time interval based on a first user setting associated with a first user account through a chatroom in which the first user account and a bot account related to the fiction participate on a messenger installed on the first user terminal.

According to an aspect of at least one example embodiment, a fiction replay method executed on a terminal implemented as a computer, the terminal including at least one processor configured to execute computer-readable instructions included in a memory, includes receiving, by the computer system, a plurality of contents included in a fiction and an output time interval associated with each content in response to a content request from a user of the terminal, providing, by the computer system, a user interface that is configured to allow the user to input a replay setting, receiving, by the computer system, a specific replay setting related to the fiction through the user interface from the user, and replaying, by the computer system, at least one of the plurality of contents at a corresponding output time interval based on the specific replay setting through a chatroom in which a bot account related to the fiction participates on a messenger installed on the terminal.

A portion of the plurality of contents may be associated with at least one character among characters in the fiction, and the replaying may include displaying content associated with the at least one character among the characters in the fiction as a message of the at least one character in the chatroom.

The replaying may include displaying a first type of content unassociated with characters of the fiction among the plurality of contents to differ from a second type of content associated with at least one character among the characters of the fiction among the plurality of contents.

The providing may include providing the user interface configured to allow the user to select at least one character from among characters of the fiction, the receiving a specific replay setting may include receiving a selection of the at least one character through the user interface from the user, and the replaying may include displaying content associated with the selected at least one character to differ from content associated with an unselected character through the user interface in the chatroom.

The providing may include providing the user interface configured to allow the user to set a replay speed, the receiving a specific replay setting may include receiving a setting of the replay speed through the user interface from the user, and the replaying may include overlaying the replay speed at an output time interval associated with each content based on the specific replay setting received through the user interface and replaying at least one content among the plurality of contents at the replay speed overlaid at the output time interval through the chatroom.

The fiction replay method may further include receiving, by the computer system, a selection on a single piece of content from among the plurality of contents from the user; receiving, by the computer system, at least one of a comment and a preference related to the single piece of content from a server in response to the selection, and displaying, by the computer system, the received at least one of the comment and the preference or providing a user interface configured to allow the user to input the comment or the preference related to the single piece of content.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 5 illustrates an example of a user interface screen related to a fiction registration procedure according to at least one example embodiment;

DETAILED DESCRIPTION

Figure 1:
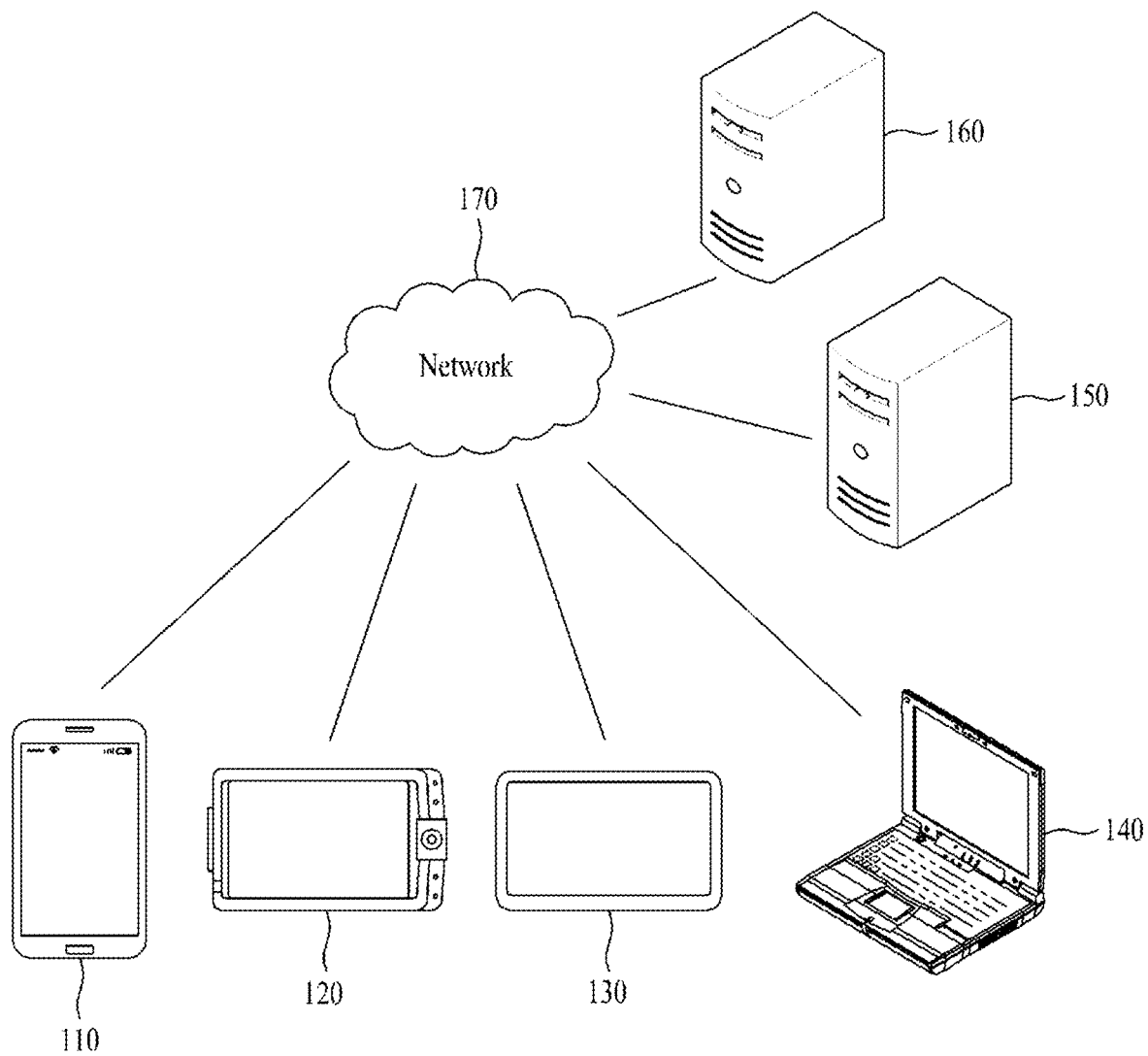
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for providing a fiction using a chat interface of a messenger.

Some example embodiments described herein may provide a replay function of sequentially outputting contents of a fiction based on a message unit using a chat interface of a messenger and may achieve many advantages in terms of availability, efficiency, convenience, and cost saving accordingly.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messenger service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
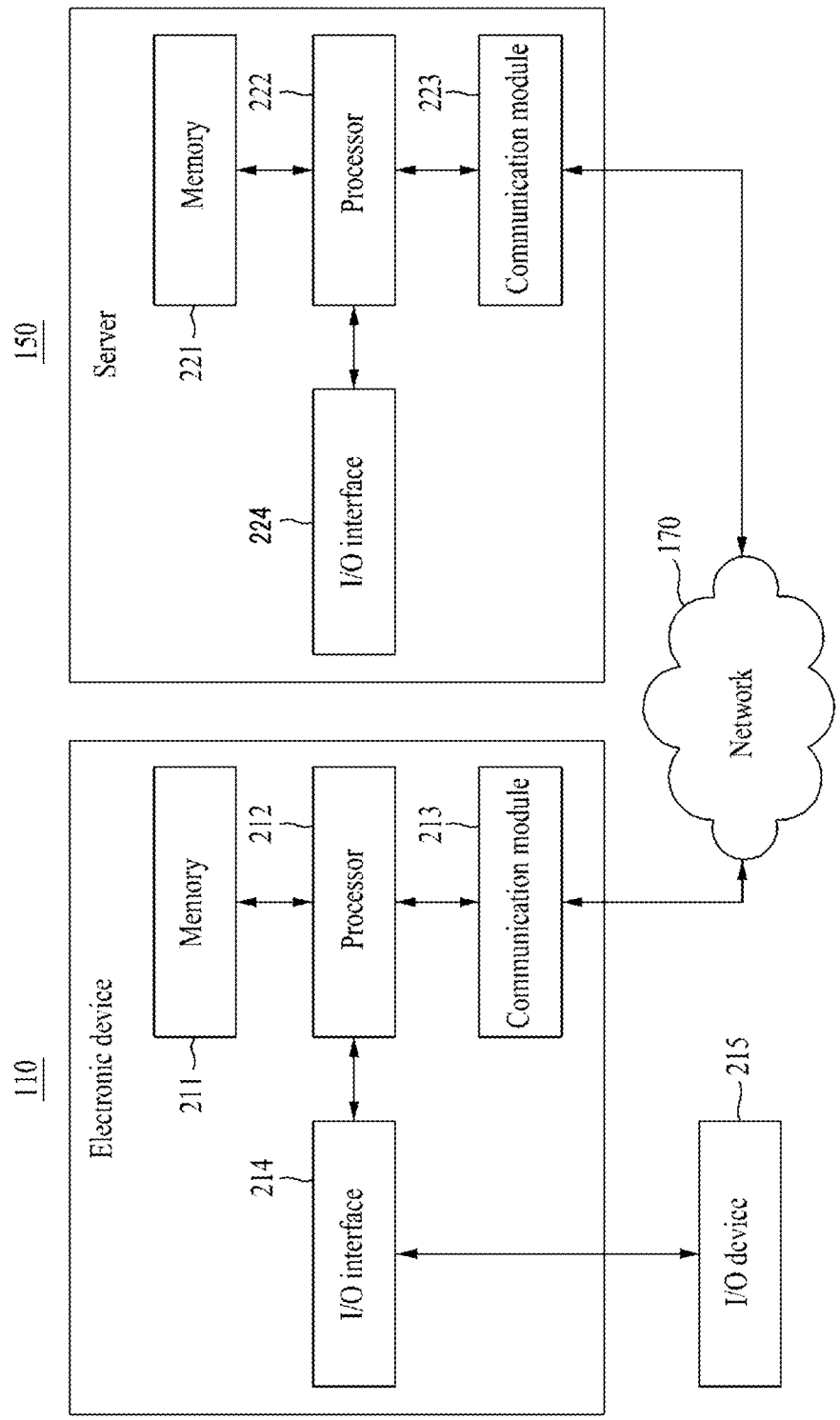
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as a random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a number of components greater than or less than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. For example, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, some example embodiments of a method and system for providing a fiction through a messenger are described.

Figure 3:
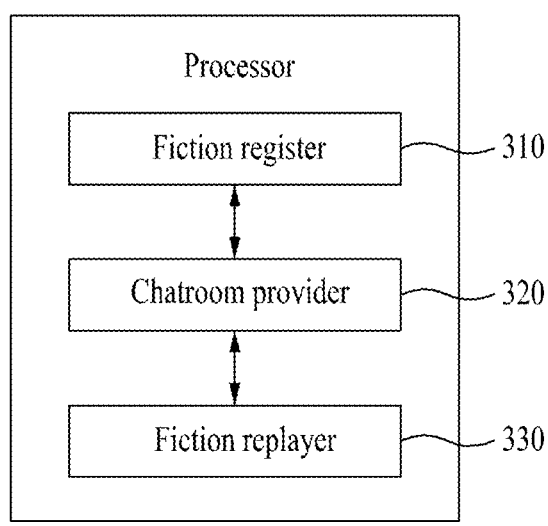
FIG. 3 is a diagram illustrating an example of components includable in a processor of a server according to at least one example embodiment.
Figure 4:
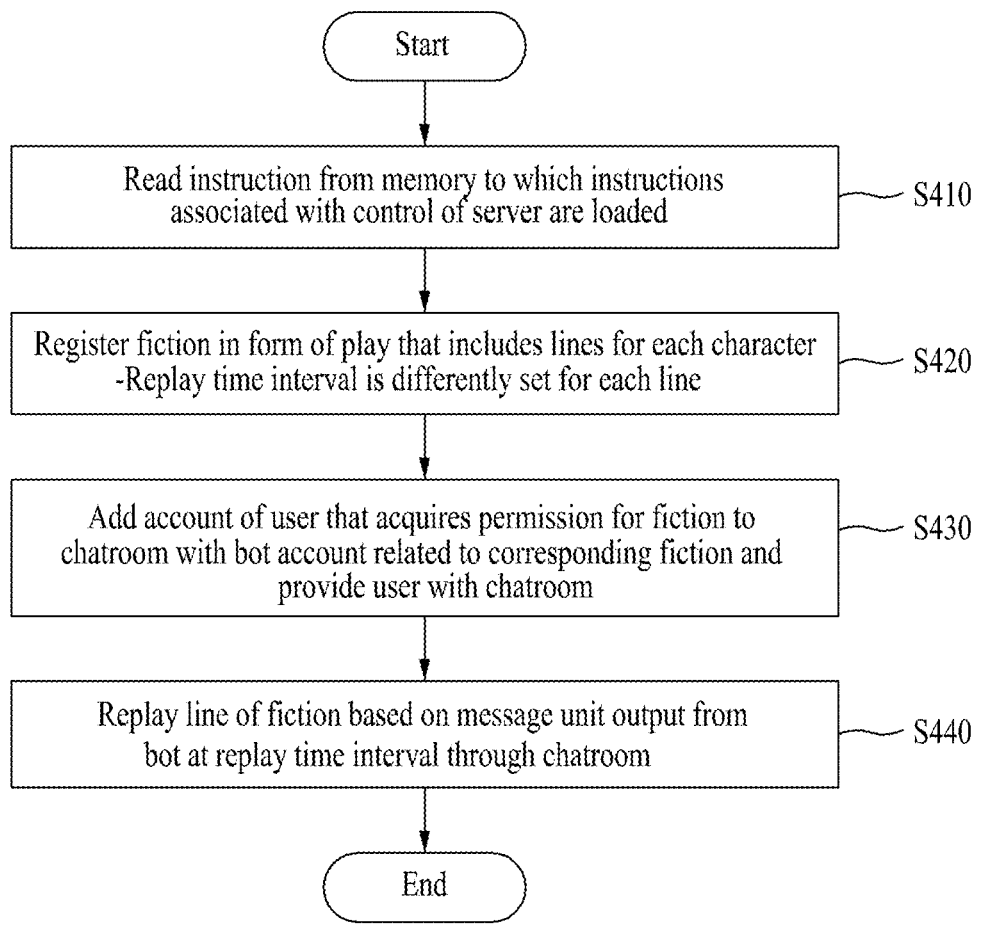
FIG. 4 is a flowchart illustrating an example of a method performed by a server according to at least one example embodiment.

FIG. 3 is a diagram illustrating an example of components includable in a processor of a server according to at least one example embodiment, and FIG. 4 is a flowchart illustrating an example of a method performed by a server according to at least one example embodiment.

The server 150 according to the example embodiment serves as a platform configured to provide a fiction service to the plurality of electronic devices 110, 120, 130, and 140 that are clients, through a messenger. The server 150 may provide the fiction service through interaction with an application, for example, the messenger, installed on each of the electronic devices 110, 120, 130, and 140. For example, the server 150 may provide a replay function of sequentially outputting contents of a fiction based on a message unit using a chat interface of the messenger.

Referring to FIG. 3, to perform a fiction providing method of FIG. 4, the processor 222 of the server 150 may include a fiction register 310, a chatroom provider 320, and a fiction replayer 330. Depending on example embodiments, the components of the processor 222 may be selectively included in or excluded from the processor 222. Also, depending on example embodiments, the components of the processor 222 may be separated or merged for representations of functions of the processor 222.

The processor 222 and the components of the processor 222 may control the server 150 to perform operations 5410 to 5440 included in the fiction providing method of FIG. 4. For example, the processor 222 and the components of the processor 222 may be implemented to execute an instruction according to a code of at least one program and a code of an OS included in the memory 221.

Here, the components of the processor 222 may be representations of different functions of the processor 222 performed by the processor 222 in response to an instruction provided from a program code stored in the server 150. For example, the fiction register 310 may be used as a functional representation of the processor 222 that controls the server 150 to register a fiction provided from a content provider, for example, a writer and a platform manager.

In operation 5410, the processor 222 may read an instruction from the memory 221 to which instructions associated with control of the server 150 are loaded. In this case, the read instruction may include an instruction to control the processor 222 to perform the following operations 5420 to 5440.

In operation 5420, the fiction register 310 may receive content and an output time interval associated with the content from a content provider terminal, store the content and the output time interval, and register a fiction that includes the content. For example, the fiction register 310 may register a fiction that includes character-related content for each character based on a setting of a content provider. The character-related content may include lines of a corresponding character and a narration or situation description, a sound effect, and the like. The fiction register 310 may provide a separate tool for creating fiction contents for all of users having messenger accounts. Here, a fiction writing tool may include various types of forms and menus capable of inputting fiction contents. The fiction register 310 may receive, from the content provider terminal, each content and an output time interval for each content through the fiction writing tool and may register a fiction that includes the received content. For example, the fiction writing tool may include a function of registering a character, a function for an environmental setting (e.g., a profile, a background image, and/or an illustration) for each character, a function of inputting other contents, such as lines of a character, a commentary or a text, etc., as development of the fiction, and a function of inputting an output time interval at which content, such as lines or other contents, are replayed. The fiction register 310 may sequentially receive content (lines or other contents) according to the development of the fiction through the fiction writing tool from the content provider, may store the received content in input order, and may store the output time interval input from the content provider in association with corresponding content for each content. When the fiction includes a plurality of subsets, for example, a plurality of episodes, the fiction register 310 may register the fiction for each subset. For example, the fiction register 310 may receive each piece of content and an output time interval for each content from the content provider terminal, and may register the same in association with a corresponding subset.

The function of inputting content (lines or other contents) may include a function capable of inserting content providable on a messenger, such as an emoticon, an animation sticker, a sound sticker, a popup sticker, a voice effect, and the like, in the middle of the contents. Through this, in the case of writing the fiction, limitations of an interface of an existing web fiction may be overcome by actively or aggressively using content on the messenger.

In the example embodiment, a fiction registered by a content provider may be stored in a database (not shown) included in or linkable to the server 150 and may be provided through a chat interface, that is, a chatroom of the messenger, in response to a request from a user (hereinafter, a reader). Here, a service is provided in a replay form in which the content, such as lines of the fiction or other contents (commentary, the text, etc.) may be sequentially output based on a message unit as if chats are sent and received in real time between characters. Here, an output time interval represents an interval at which corresponding content (lines or other contents) appears in a chatroom of the messenger. For example, the output time interval may refer to a time interval between contents (lines or other contents), that is, a time interval at which subsequent content is output after previous content is output. The fiction register 310 may individually set an output time interval per content (lines or other contents) based on a setting of the content provider. If the content provider does not set the output time interval, a time interval may be set to a desired (or alternatively, preset) default value.

When the content provider sequentially inputs content (lines or other contents) according to the development of the fiction through the fiction writing tool, the content may be registered in a corresponding order and a fiction may be written in a form of a play that develops over time. For example, by setting a replay time interval differently for each content according to the intent of the content provider, a situation (e.g., a situation in which two characters are in a sharp conflict) of the play may be delivered through the output time interval, which may improve an immersion effect into the play.

In operation 5430, the chatroom provider 320 may add an account of a user (hereinafter, a reader) that acquires a permission for the fiction to a chatroom with a bot account (hereinafter, a fiction bot) related to the corresponding fiction and may provide the reader with the chatroom with the fiction bot. For example, a reader that purchases a fiction through a payment, a reader that acquires a fiction through an event, and like, may be granted a permission for the corresponding fiction. Here, the chatroom provider 320 may create and provide a one-to-one chatroom in which an account of a reader having authority and an account of a fiction bot are matched.

According to an example embodiment, the chatroom provider 320 may provide a chatroom in association with a community service on the messenger. The server 150 may provide a separate community channel for each fiction provided by the fiction service. The chatroom provider 320 may add or associate a user account to or with a community channel corresponding to a fiction selected by a user of the messenger. That is, the server 150 may create a community channel corresponding to a fiction registered by a corresponding content provider in response to a request from the content provider, and in response to a permission for the fiction being given to an account of a reader, may add the account of the reader to the community channel and may create a chatroom in which the account of the reader and an account of the fiction bot participate in association with the community channel.

When the fiction includes a plurality of subsets, for example, a plurality of episodes, the chatroom provider 320 may determine whether to give a permission for each of the subsets to the user. When the user is determined to be given a permission for at least one subset, the chatroom provider 320 may add or associate a user account to or with a community channel of the corresponding fiction as a reader account and may create a chatroom with the reader and a fiction bot corresponding to the at least one subset for which a permission is given to the reader among fiction bots associated with the plurality of subsets of the corresponding fiction. That is, a plurality of chatrooms may be set for each community channel. Here, a permission may be given for each subset and a chatroom may be created. A different environmental setting may be applied by grouping a plurality of chatrooms based by community channel for each fiction. Here, a separate chatroom with a fiction bot may be provided for each subset to manage a right of the reader in detail. For example, if a user X enters "view" for a first episode of a fiction A that is provided free of charge by a fiction service, the chatroom provider 320 that receives an input of the user X may add a user account of the user X to a fiction A community channel as a reader account and may provide a chatroom with the user X and a fiction bot corresponding to the first episode of the fiction A through the fiction A community channel. If the user X enters "view" for a second episode of the fiction A that is provided for a fee by the fiction service, the chatroom provider 320 that receives an input of the user X may determine whether a permission for the second episode of the fiction A is given to the user X, and when it is determined that the permission is given to the user X, may provide a chatroom between the user X and a fiction bot corresponding to the second episode of the fiction A through the fiction A community channel. The server 150 may create a separate community chatroom in a community channel of the fiction in association with the corresponding community channel and then may allow accounts of readers given a permission for the corresponding fiction or at least one subset of the corresponding fiction to participate in the corresponding community chatroom. By providing the fiction service as above and allowing readers to communicate with other readers through this community channel, a community service may be further efficiently provided.

In operation 5440, the fiction replayer 330 may provide each content included in the fiction to a terminal of a reader such that the content may be replayed at a corresponding output time interval based on a reader setting associated with the corresponding reader through a chatroom in which an account of the reader and the fiction bot account participate, in response to a request from the reader on a messenger installed on the terminal of the reader. That is, the fiction replayer 330 may provide content (lines or other contents) of the fiction based on a message unit output from the fiction bot at an output time interval set by a content provider, such that the fiction may be replayed through the chatroom in which the account of the reader and the account of the fiction bot are matched. The fiction replayer 330 may replay the fiction contents in a similar manner to a structure in which users exchange messages in real time in the chatroom of the messenger. Therefore, the fiction replayer 330 may provide a more lively and focused fiction service by sequentially outputting the fiction contents based on a message unit as if actual characters exchange messages rather than a reader reading the statically written fiction contents. Here, the fiction replayer 330 may provide each content (lines or other contents) at an output time interval set by the content provider, such that the fiction contents may be replayed quickly in a situation in which two characters are in a sharp conflict in the context and may be replayed at a normal speed in other situations. In this manner, readers may be further deeply immersed into the fiction contents. For example, the fiction replayer 330 may provide a message corresponding to the content (lines or other contents) of the fiction based on a setting of the corresponding reader through the chatroom between the fiction bot and the reader. Here, the reader may set a content placement, a replay speed, a profile related to each character, a background image, and an illustration for the fiction to be replayed.

FIG. 5 illustrates an example of a service page displayed on a user terminal, for example, the electronic device 120, used by a content provider as a user interface related to a fiction registration procedure of the fiction register 310 according to at least one example embodiment.

FIG. 5 illustrates a fiction writing screen 500. Referring to FIG. 5, the fiction writing screen 500 may include a menu 501 for selecting a character or a commentary (or the text), a menu 502 for inputting content, such as lines or a commentary (or the text) of a character, and a menu 503 for inputting an output time interval at which the corresponding content is replayed, as a fiction writing tool that includes a form and a menu for a content provider to write a fiction. Here, the menu 502 for inputting the content may include an environment capable of inputting a text and also any content attachable in the messenger, such as, an image (a sticker, an emoticon, etc.), a photo, a video, a voice file, and a link.

Further, the fiction writing screen 500 may further include a menu for inputting basic information, such as title or subset information (episode information) of a fiction, a menu for registering a list of characters, and a menu for setting an environment for each character as a menu for pre-settings.

The content provider may sequentially input the contents of the fiction in a form of a play and, here, may write the fiction while adjusting an output time interval at which subsequent content is replayed after previous content is output through the menu 503 for inputting the output time interval. Also, it is not a simply text-oriented writing and a variety of contents, such as a sticker and an emoticon, may be appropriately added in the middle of content or a commentary situation to be displayed for readers. That is, the content provider may create the fiction in which corresponding content is delivered to a fiction bot by inputting the content, such as a sticker, after specific content or contents.

FIGS. 6 to 11 illustrate examples of a service page displayed on a user terminal, for example, the electronic device 110, used by a reader as a user interface associated with a fiction replay procedure of the fiction replayer 330.

The electronic device 110 may perform the following fiction replay method and the processor 212 of the processor 110 may control the electronic device 110 to perform operations included in the fiction replay method.

For example, in response to a request from a reader, the processor 212 may receive, from the server 150, content included in a fiction and an output time interval associated with each content and may replay each content of the fiction at a corresponding output time interval through a chatroom in which an account of a fiction bot participates on a messenger installed on the electronic device 110.

Figure 6:
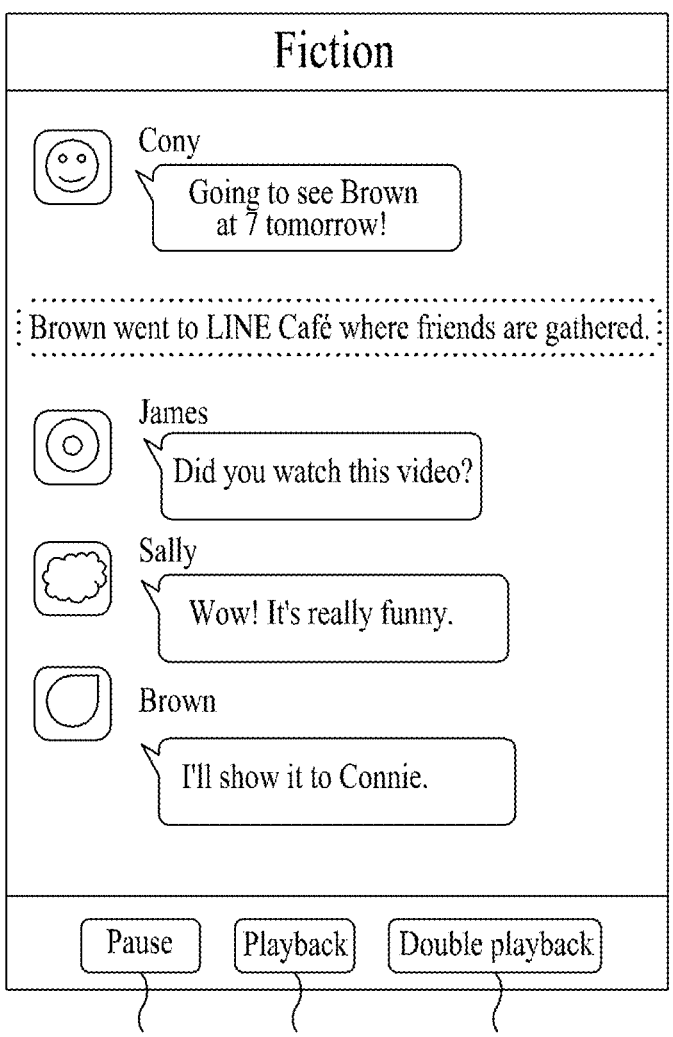
FIGS. 6 to 8 illustrate examples of a user interface related to a fiction replay procedure according to at least one example embodiment.

FIG. 6 illustrates an example of a fiction replay screen 600. Referring to FIG. 6, the fiction replay screen 600 represents a chatroom in which an account of a reader and an account of a fiction bot are matched. Content for each character is sequentially output as a message 601 of a character associated with corresponding content at an output time interval set for the corresponding content. For example, if the output time interval is set to 0.5 seconds for content "Wow! It's really funny." of "Sally," the content "Wow! It's really funny." of "Sally" may be output 0.5 seconds after content "Did you watch this video?" of "James" is output. That is, the content for each character may be output based on a chat message unit in a chatroom and may be output in a form of the message 601 that is sent from a character side associated with corresponding content through the fiction bot.

Dissimilar to content of a type associated with a character, a commentary or the text of the fiction refers to a type of content that is unassociated with characters and may be output as a message in a form different from the content associated with the character and may be output in a form of a message 602 that is transferred by a system as a neutral interface of the chatroom. Herein, an interface of notifying a participation of a new user in the chatroom or an interface of distinguishing dates on the messenger may be employed. In the case of the commentary or the text not the content of a character, not a chat message but a system in a neutral position may deliver the contents.

Figure 7:
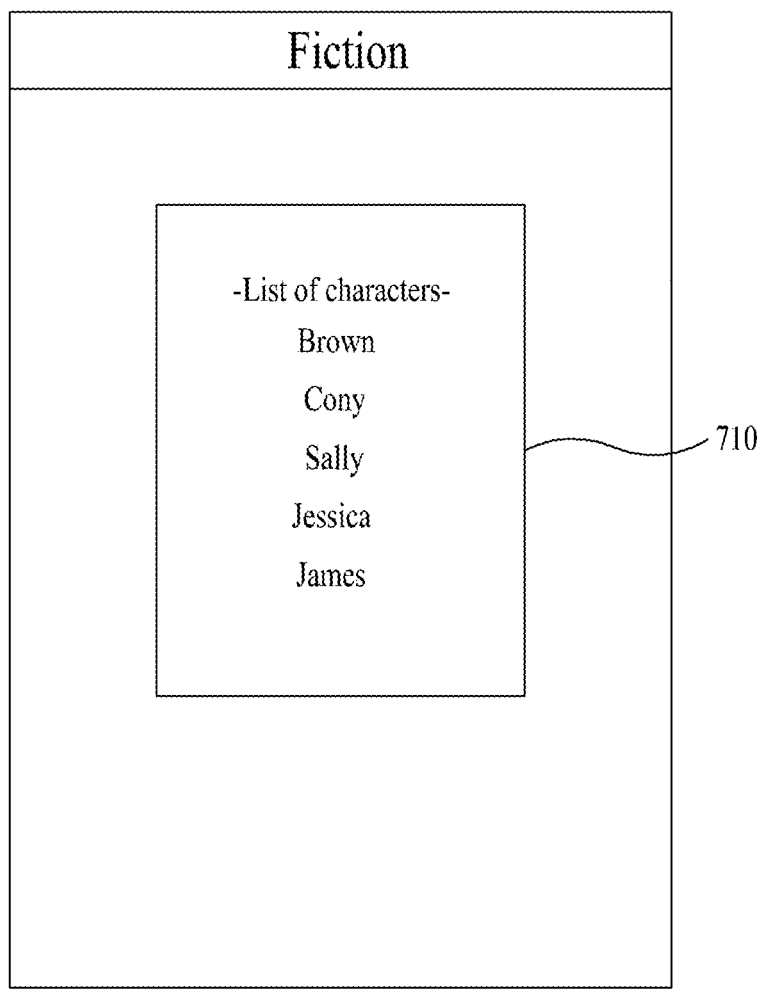
Figure 8:
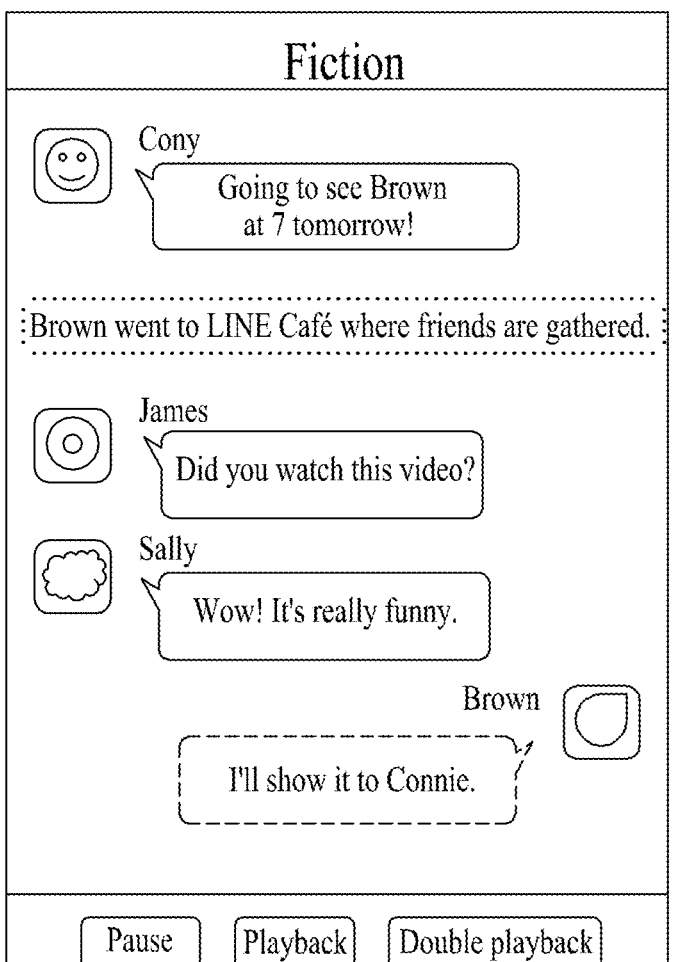
Figure 8:
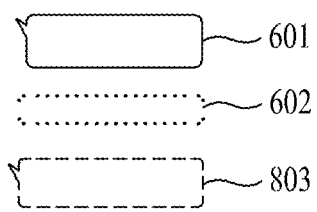

FIGS. 7 and 8 illustrate another example of a fiction replay screen 700.

As another example, the processor 212 may provide a user interface for a replay setting of a reader before performing a fiction replay, may receive the replay setting of the reader through the user interface, and may replay each content of a fiction at a corresponding output time interval based on the replay setting of the reader through a chatroom, in which an account of a fiction bot participates, on a messenger installed on the electronic device 110. The reader may set a content placement, a replay speed, a profile related to each character, a background image, and/or an illustration for the fiction to be replayed and, through this, may provide a reader-customized fiction replay environment.

Referring to FIGS. 7 and 8, the fiction replay screen 700 represents a chatroom in which an account of the reader and an account of the fiction bot are matched. When the reader is initially invited to the chatroom with the fiction bot, the fiction replay screen 700 may initially provide a list of characters 710 as a user interface capable of selecting at least one character from among characters of the fiction such that the reader may select a desired character to be output as a chat message of the reader. Here, if the reader starts to replay the fiction without selecting a character, each of contents of all characters may be output in the form of the message 601 that is sent from a character side associated with corresponding content, which is described above with reference to FIG. 6. Meanwhile, when the reader selects a single specific character from the list of characters 710, content of the character selected by the reader may be displayed differently from contents of other characters unselected by the reader. For example, the content of the character selected by the reader may be output in a form of a message 803 sent from a reader side and each of the contents of the remaining characters may be output in the form of the message 601 sent from a character side associated with each corresponding content. For example, referring to FIG. 8, when the reader selects "Brown" from the list of characters 710, content "I'll show it to Connie" of "Brown" may be output in the form of the message 803 sent from the reader as if the reader speaks. Therefore, at least one character may be selected from among characters before the fiction replay starts and content of the corresponding character may be displayed as words directly delivered by the reader in the chatroom. Through this, a preference or a selection of the reader for the character may be calculated and a user interface of displaying the calculated preference or selection may be provided.

Also, the fiction replay screen 600, 700 may further include a menu for an environment setting for each character as one of user participation functions. The reader may directly set or modify an interface, such as, for example, a profile, a background image, and/or an illustration related to each character of the fiction being replayed, through the chatroom of the messenger.

The fiction replay screen 600, 700 may include a pause menu 620, 820 for pausing a fiction replay, a playback menu 630, 830 for starting the fiction replay, and a double speed playback menu 640, 840 for adjusting a replay speed. When the reader executes the pause menu 620, 820, scrolls down the fiction replay screen 600, 700, or closes the fiction replay screen 600, 700 during the fiction replay, the fiction replayer 330 may recognize a corresponding event as a replay pause event and may pause the fiction replay and, at the same time, and remember last output content. Thereafter, when the reader executes the fiction replay screen 600, 700 or executes the playback menu 630, 830 on the fiction replay screen 600, 700, the fiction replay may be resumed after the remembered content stored according to the replay pause event. The fiction replayer 330 may provide a user interface that allows the reader to set a replay speed of the fiction and may receive a setting of the replay speed by the reader through the corresponding user interface. For example, the fiction replayer 330 may adjust a message output speed, that is, a replay speed in response to an input from the reader using the double playback menu 640, 840 during the fiction replay. Here, the fiction replayer 330 may overlay the replay seep set by the reader on an output time interval associated with each corresponding content and may replay the corresponding content at the overlaid output time interval. For example, when the reader executes the double playback menu 640, 840, the fiction replayer 330 may increase or decrease the overall output speed of the output time interval according to a setting of the content provider by 1.5 times or 2 times. Also, based on the setting of the content provider, the fiction replayer 330 may output content at a constant speed regardless of the output time interval according to the setting of the content provider, that is, by overriding the output time interval.

Further, in response to receiving a selection on a single piece of content among contents of the fiction from the reader, the processor 212 may receive a comment and/or a preference input from another reader in association with the selected content and display the received comment and/or preference, or may provide a user interface that allows the reader to directly input a comment and/or a preference.

Figure 9:
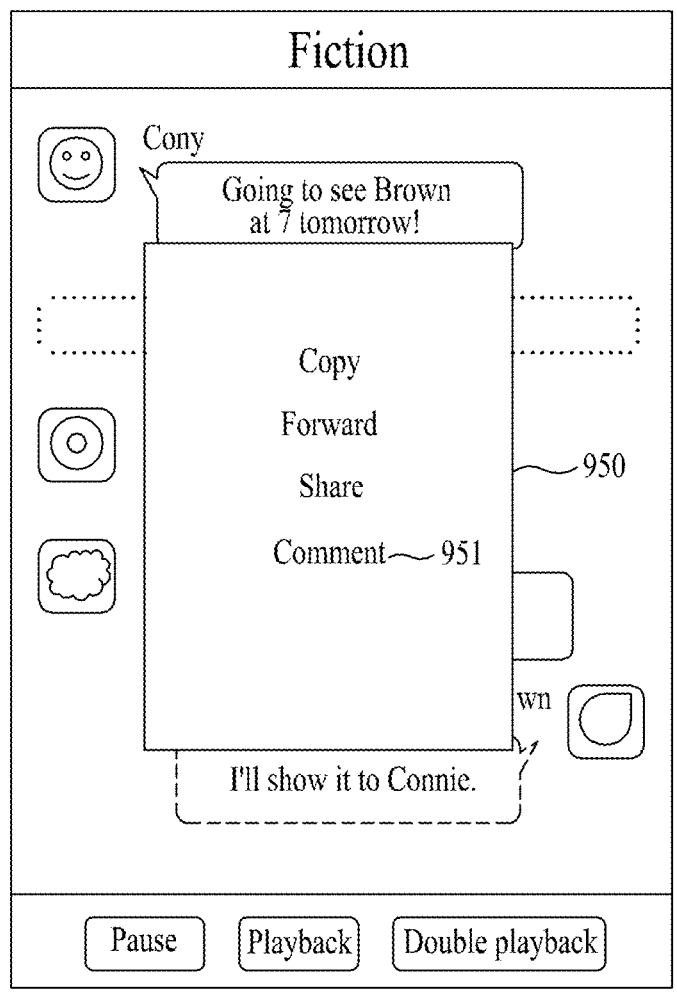
FIGS. 9 to 11 illustrate examples of a user interface screen related to statistical information and a community space about a fiction according to at least one example embodiment.

Referring to FIG. 9, in response to a selection from the reader on a specific message on the fiction replay screen 600, 700, the fiction replayer 330 may output a menu list 950 as an interface for, for example, copy, forward, share, and input of a comment for the selected specific message. The menu list 950 may include a comment menu 951 that allows the reader to directly input a comment on specific content of a fiction being replayed. That is, the fiction replayer 330 may provide an interface that allows the reader to leave a comment or verify a comment of another reader for each content, that is, based on a message unit in the fiction being replayed.

Figure 10:
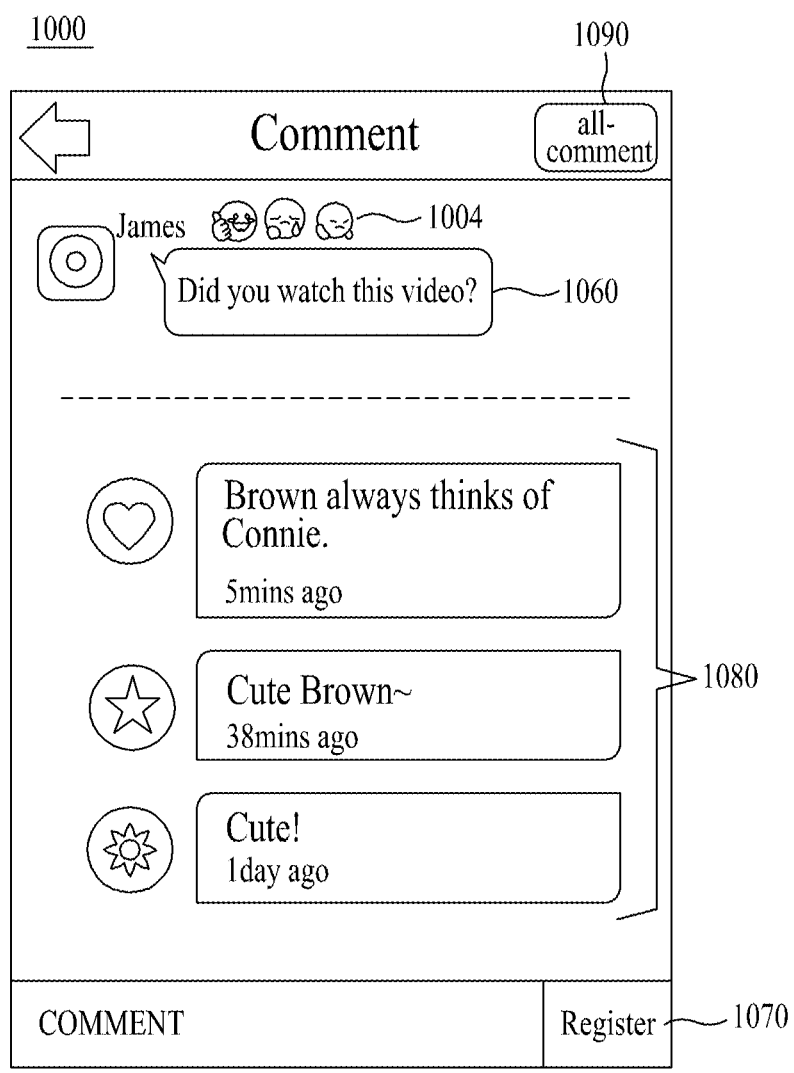
Figure 11:
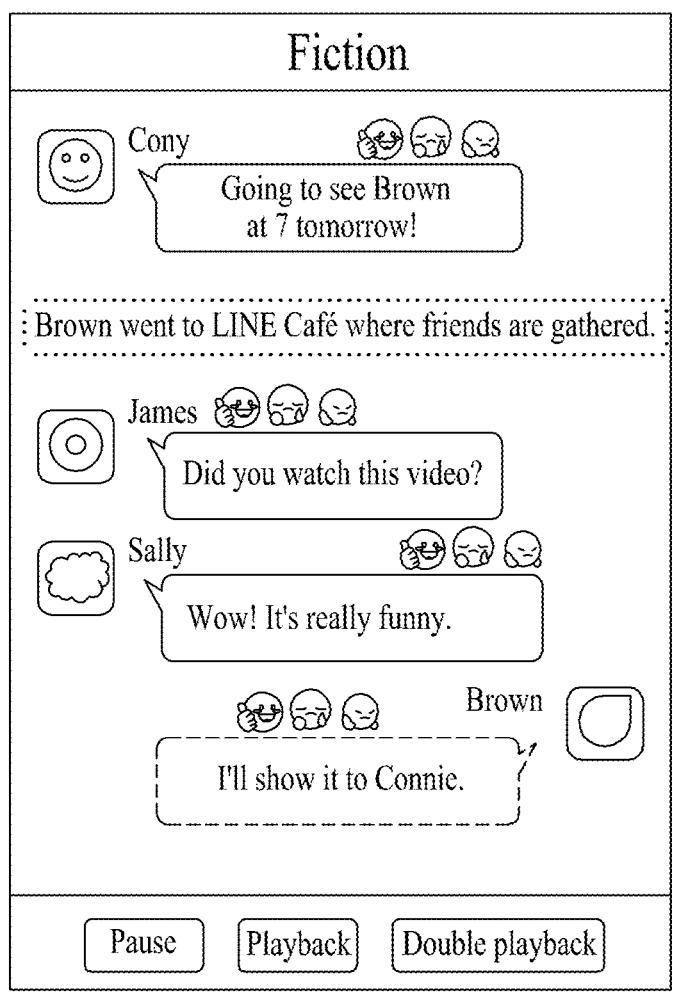

Each piece of content of the fiction may be output in a form of a single message. Here, each message may include a uniform resource locator (URL) that is not directly exposed. Therefore, when the reader desires to view comments of other readers or to directly leave a comment on specific content, the reader may be directed to a comment space through the URL by selecting the corresponding content. Referring to FIG. 10, when the reader selects the specific content and then selects the comment menu 951 from the menu list 950 on the fiction replay screen 600, 700, the fiction replayer 330 may provide a comment screen 1000 related to the selected content. Here, the comment screen 1000 may include an interface 1070 for creating a comment using a text, a voice file, a sticker, and/or an emoticon, for content 1060 selected by the reader and may also include a list of comments 1080 created by other readers on the content 1060. Also, the comment screen 1000 may further include a function that allows the reader to create a comment on a comment left by another comment and a function that allows the reader to input a preference, such as like or recommend. The comment screen 1000 may include comment for each content input by selecting specific content from among contents of the fiction and may further include an all-comment menu 1090 for moving to a screen on which the reader may view comments input for the entire fiction at a time without selecting content. The reader may verify comments or preferences (e.g., like or recommend) left by other readers and communicate with another reader on the comment screen 1000 provided for each comment.

The processor 222 may calculate statistical information for each content by aggregating comments or preferences left by readers for each content of the fiction and may provide the statistical information or a variety of feedback using the statistical information to users (e.g., a content provider and/or a reader). For example, the processor 222 may select and display ten contents in the order of "like" and may select and display a popular episode in the order of a number of comments.

Further, the fiction replayer 330 may provide the statistical information for each content to the content provider and readers as feedback information. For example, referring to FIG. 10, when providing the comment screen 1000 for the content 1060 selected by the reader, the fiction replayer 330 may also provide statistical information 1004 acquired from comments or preferences of other readers. As another example, referring to FIG. 11, when outputting content of a character based on a message unit in a fiction replay process, the fiction replayer 330 may also output statistical information 1104 acquired from comments or preferences of readers having read the corresponding fiction in association with each corresponding message.

Although it is described that the server 150 performs the fiction providing method on the side of the server 150 through interaction with an application (e.g., the messenger installed on the electronic device 110 or 120), it is provided as an example only. Depending on example embodiments, the electronic device 110 may perform at least a portion of the fiction providing method in response to an instruction provided from the application installed on the electronic device 110.

For example, in order for the electronic device 110 or 120 to perform at least a portion of the fiction providing method of FIG. 4, a processor of a corresponding electronic device may include a fiction register, a chatroom provider, and/or a fiction replayer. Depending on example embodiments, the fiction register, the chatroom provider, and the fiction replayer may be selectively included in or excluded from the processor 212 or 222 of the electronic device 110 or 120 and may be separated or merged for representation of a function of the processor 212 or 222.

The fiction register, the chatroom provider, and the fiction replayer included in the processor 212 or 222 of the electronic device 110 or 120 may perform operations 5420 to 5440 of FIG. 4 in a manner identical or corresponding to the fiction register 310, the chatroom provider 320, and the fiction replayer 330 of FIG. 3. Therefore, further description related thereto is omitted.

According to the example embodiments, it is possible to provide a replay function of sequentially outputting lines of a fiction based on a message unit through a chat interface of a messenger. For example, it is possible to provide an interface environment having liveness and immersion by differently setting an output time interval for each content according to the content development or situation of a fiction. Also, according to the example embodiments, it is possible to provide an environment that allows a user participation by outputting content of a character selected by a user as a user side message through a chat interface of a messenger. Also, it is possible to provide a function that allows a user to directly input a comment for each content of a fiction being replayed and a function of verifying preferences of other users.

According to the example embodiments, a replay function of sequentially outputting lines of a fiction based on a message unit may take advantage of an established chat interface of a messenger without a need to install a separate application or an interface for the replay function. Further, an interface environment having liveness and immersion by differently setting an output time interval for each content and/or an environment that allows a user participation by outputting content of a character selected by a user as a user side message through a chat interface of a messenger may be easily provided through an established chat interface of a messenger, without requiring a new application or an interface. Thus, the methods or computer systems according to the example embodiment may be implemented consuming less system resources (e.g., a memory and/or a processor).

The apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A fiction providing method performed by a computer system, which includes at least one processor configured to execute computer-readable instructions included in a memory, the fiction providing method comprising:

receiving, by the computer system, content and an output time interval associated with the content from a content provider terminal;

storing, by the computer system, the content and the output time interval;

registering, by the computer system, a fiction that comprises the content; and providing, by the computer system, the content to a first user terminal to replay the content included in the fiction at the output time interval based on a first user setting associated with a first user account through a chatroom in which the first user account and a bot account related to the fiction participate, on a messenger installed on the first user terminal.

2. The fiction providing method of claim 1, wherein the registering comprises:

receiving the content and the output time interval from the content provider terminal through a fiction writing tool that comprises a function of inputting the content and the output time interval associated with the content.

3. The fiction providing method of claim 1, further comprising:

creating, by the computer system, the chatroom in which the first user account and the bot account participate in response to a permission for the fiction being given to the first user account.

4. The fiction providing method of claim 1, further comprising:

creating, by the computer system, a community channel corresponding to the fiction in response to a request from the content provider terminal; and adding, by the computer system, the first user account to the community channel in response to a permission for the fiction being given to the first user account, wherein the providing comprises creating the chatroom in which the first user account and the bot account participate in association with the community channel.

5. The fiction providing method of claim 4, wherein the registering comprises associating a plurality of contents received from the content provider terminal with a subset of the fiction, and the providing comprises, creating a first chatroom in which the first user account and the bot account participate in association with the community channel in response to a permission for the subset being given to the first user account, and providing a plurality of contents included in the subset to the first user terminal to replay each of the plurality of contents at a corresponding output time interval through the first chatroom on the messenger in response to a request from the first user terminal for the subset.

6. The fiction providing method of claim 4, wherein the creating a community channel comprises creating a community chatroom in association with the community channel, and the adding comprises allowing the first user account to participate in the community chatroom in response to the permission for the fiction being given to the first user account.

7. The fiction providing method of claim 1, further comprising:

calculating, by the computer system, statistical information for each content based on a comment or a preference on each content of the fiction received from a plurality of user terminals; and providing, by the computer system, the statistical information for each content to the content provider terminal or at least one user terminal among the plurality of user terminals.

8. A non-transitory computer-readable record medium storing instructions that, when executed by a processor, cause a computer system to perform the fiction providing method of claim 1.

9. A computer system comprising:

at least one processor configured to execute computer-readable instructions included in a memory, such that the at least one processor configures the computer system to, receive content and an output time interval associated with the content from a content provider terminal, store the content and the output time interval, register a fiction that comprises the content, and provide the content to a first user terminal to replay the content comprised in the fiction at the output time interval based on a first user setting associated with a first user account through a chatroom in which the first user account and a bot account related to the fiction participate, on a messenger installed on the first user terminal.

10. The computer system of claim 9, wherein the at least one processor is further configured to receive the content and the output time interval from the content provider terminal through a fiction writing tool that comprises a function of inputting the content and the output time interval associated with the content.

11. The computer system of claim 9, wherein the at least one processor is further configured to provide the chatroom by creating the chatroom in which the first user account and the bot account participate in response to a permission for the fiction being given to the first user account.

12. The computer system of claim 9, wherein the at least one processor is further configured to provide the chatroom by, creating a community channel corresponding to the fiction in response to a request from the content provider terminal, adding the first user account to the community channel in response to a permission for the fiction being given to the first user account, and creating the chatroom in which the first user account and the bot account participate in association with the community channel.

13. The computer system of claim 12, wherein the at least one processor is further configured to, associate a plurality of contents received from the content provider terminal with a subset of the fiction, create a first chatroom in which the first user account and the bot account participate in association with the community channel in response to a permission for the subset being given to the first user account, and provide the plurality of contents included in the subset to the first user terminal to replay each of the plurality of contents at a corresponding output time interval through the first chatroom on the messenger in response to a request from the first user terminal for the subset.

14. The computer system of claim 12, wherein the at least one processor is further configured to, create a community chatroom in association with the community channel, and allow the first user account to participate in the community chatroom in response to the permission for the fiction being given to the first user account.

15. The computer system of claim 9, wherein the at least one processor is further configured to,
calculate statistical information for each content based on a comment or a preference on each content of the fiction received from a plurality of user terminals, and
provide the statistical information for each content to the content provider terminal or at least one user terminal among the plurality of user terminals.

16. A fiction replay method executed on a terminal implemented as a computer, the terminal comprising at least one processor configured to execute computer-readable instructions stored in a memory, the fiction replay method comprising:
receiving, by the at least one processor, a plurality of contents included in a fiction and an output time interval associated with each content in response to a content request from a user of the terminal;
providing, by the at least one processor, a user interface configured to allow the user to input a replay setting;
receiving, by the at least one processor, a specific replay setting related to the fiction through the user interface from the user; and
replaying, by the at least one processor, at least one of the plurality of contents at a corresponding output time interval based on the specific replay setting, through a chatroom, in which a bot account related to the fiction participates, on a messenger installed on the terminal.

17. The fiction replay method of claim 16, wherein
a portion of the plurality of contents is associated with at least one character among characters in the fiction, and
the replaying comprises displaying content associated with the at least one character among the characters in the fiction as a message of the at least one character in the chatroom.

18. The fiction replay method of claim 16, wherein the replaying comprises displaying a first type of content unassociated with characters of the fiction among the plurality of contents to differ from a second type of content associated with at least one character among the characters of the fiction among the plurality of contents.

19. The fiction replay method of claim 16, wherein
the providing comprises providing the user interface configured to allow the user to select at least one character from among characters of the fiction,
the receiving a specific replay setting comprises receiving a selection of the at least one character through the user interface from the user, and
the replaying comprises displaying content associated with the selected at least one character to differ from content associated with an unselected character through the user interface in the chatroom.

20. The fiction replay method of claim 16, wherein
the providing comprises providing the user interface configured to allow the user to set a replay speed,
the receiving a specific replay setting comprises receiving a setting of the replay speed through the user interface from the user, and
the replaying comprises,
overlaying the replay speed at an output time interval associated with each content based on the specific replay setting received through the user interface, and
replaying at least one content among the plurality of contents at the replay speed overlaid at the output time interval through the chatroom.

21. The fiction replay method of claim 16, further comprising:
receiving, by the at least one processor, a selection on a single piece of content from among the plurality of contents from the user;
receiving, by the at least one processor, at least one of a comment and a preference related to the single piece of content from a server in response to the selection; and
displaying, by the at least one processor, the received at least one of the comment and the preference or providing a user interface configured to allow the user to input the comment or the preference related to the single piece of content.

* * * * *